United States Patent
Jakus et al.

(10) Patent No.: US 10,236,528 B2
(45) Date of Patent: Mar. 19, 2019

(54) THREE DIMENSIONAL EXTRUSION PRINTED ELECTROCHEMICAL DEVICES

(71) Applicant: Northwestern University, Evanston, IL (US)

(72) Inventors: Adam E. Jakus, Chicago, IL (US); Ramille N. Shah, Hinsdale, IL (US); Nicholas R. Geisendorfer, Evanston, IL (US); Scott A. Barnett, Evanston, IL (US); Zhan Gao, Evanston, IL (US)

(73) Assignee: Northwestern University, Evanston, IL (US)

(*) Notice: Subject to any disclaimer, the term of this patent is extended or adjusted under 35 U.S.C. 154(b) by 294 days.

(21) Appl. No.: 15/212,534

(22) Filed: Jul. 18, 2016

(65) Prior Publication Data

US 2018/0019493 A1    Jan. 18, 2018

(51) Int. Cl.
| | |
|---|---|
| *H01M 8/124* | (2016.01) |
| *B28B 1/00* | (2006.01) |
| *B33Y 10/00* | (2015.01) |
| *B33Y 40/00* | (2015.01) |
| *B33Y 80/00* | (2015.01) |
| *C25B 9/08* | (2006.01) |

(52) U.S. Cl.
CPC ........... *H01M 8/124* (2013.01); *B28B 1/001* (2013.01); *B33Y 10/00* (2014.12); *B33Y 40/00* (2014.12); *B33Y 80/00* (2014.12); *C25B 9/08* (2013.01); *H01M 2008/1293* (2013.01)

(58) Field of Classification Search
CPC ........ H01M 8/124; B28B 1/001; B33Y 10/00; B33Y 80/00
See application file for complete search history.

(56) References Cited

U.S. PATENT DOCUMENTS

| | | | |
|---|---|---|---|
| 5,518,680 A | 5/1996 | Cima et al. | |
| 6,582,651 B1 | 6/2003 | Cochran, Jr. et al. | |
| 6,664,006 B1 | 12/2003 | Munshi | |
| 9,327,448 B2 | 5/2016 | Shah et al. | |
| 2003/0151156 A1 | 8/2003 | Crumm et al. | |
| 2004/0137301 A1* | 7/2004 | Omersa | H01M 8/0206 429/484 |
| 2005/0003189 A1 | 1/2005 | Bredt et al. | |

(Continued)

FOREIGN PATENT DOCUMENTS

| | | |
|---|---|---|
| WO | WO0069008 | 11/2000 |
| WO | WO2014209994 | 12/2014 |
| WO | WO2015175880 | 11/2015 |

OTHER PUBLICATIONS

Kyriakidou et al., Dynamic Co-Seeding of Osteoblast and Endothelial Cells on 3D Polycaprolactone Scaffolds for Enhanced Bone Tissue Engineering, Journal of Bioactive and Compatible Polymers, vol. 23, May 2008, pp. 227-243.

(Continued)

*Primary Examiner* — Erin Snelting
(74) *Attorney, Agent, or Firm* — Bell & Manning, LLC

(57) ABSTRACT

Solid oxide electrochemical devices, methods for making the electrochemical devices, and methods of using the electrochemical devices are provided. The electrochemical devices comprise a plurality of stacked functional layers that are formed by a combination of three-dimensional (3D) extrusion printing and two-dimensional (2D) casting techniques.

12 Claims, 7 Drawing Sheets

(56) References Cited

U.S. PATENT DOCUMENTS

| | | | |
|---|---|---|---|
| 2008/0008826 A1* | 1/2008 | Coulon | H01M 8/124 427/115 |
| 2008/0145639 A1 | 6/2008 | Sun et al. | |
| 2009/0117435 A1 | 5/2009 | Du et al. | |
| 2010/0279007 A1 | 11/2010 | Briselden et al. | |
| 2011/0064784 A1 | 3/2011 | Mullens et al. | |
| 2011/0196094 A1 | 8/2011 | Hamad et al. | |
| 2014/0051014 A1* | 2/2014 | Steinwandel | H01M 4/8889 429/533 |
| 2014/0099556 A1 | 4/2014 | Johnson et al. | |
| 2015/0037385 A1 | 2/2015 | Shah et al. | |
| 2015/0290860 A1* | 10/2015 | Shaw | B29C 67/0085 264/255 |
| 2017/0081534 A1 | 3/2017 | Shah et al. | |

OTHER PUBLICATIONS

Jakus et al., 3D-Bioplotted Elastic Bone Scaffolds for Tissue Engineering Applications, Poster Presentation, Oral Biology Centennial, University of Chicago, Jun. 19, 2013.

Jakus et al., Bioplotted Elastic Hydroxyapatite-Based Tissue Engineering Scaffolds, Oral Presentation, TMS Pacific Rim International Congress on Advanced Materials and Processing, Waikoloa, HA, Aug. 6, 2013.

Jakus et al., A Single Platform 3D-Printing Approach for Fabricating Tissue Engineering Bio-Scaffolds from Multiple Material Systems, Oral Presentation, Materials Science and Engineering 2013 Hilliard Symposium, Northwestern University, Evanston, May 16, 2013.

Michna et al., Concentrated hydroxyapatite inks for direct-write assembly of 3-D periodic scaffolds, Biomaterials, vol. 26, Apr. 21, 2005, pp. 5632-5639.

Shuai et al., Fabrication of porous polyvinyl alcohol scaffold for bone tissue engineering via selective laser sintering, Biofabrication, vol. 5, No. 015014, Feb. 6, 2013, pp. 1-8.

R. Shah, The Use of 3D Bioplotted Scaffolds and Ultrasonic Stimulation for Tissue Engineering, Oral Presentation, Oral Biology Centennial, University of Chicago, Jun. 19, 2013, slides 1-24.

Yeo et al., Preparation and Characterization of 3D Composite Scaffolds Based on Rapid-Prototyped PCL/β-TCP Struts and Electrospun PCL Coated with Collagen and HA for Bone Regeneration, Chem. Mater., vol. 24, Jul. 5, 2011, pp. 903-913.

Jakus et al., Biochemically Active Bioplotted Elastic Hydroxyapatite-Based Tissue Engineering Scaffolds: Structural, Mechanical, and in vitro Evaluation, Abstract for Presentation at TMS Pacific Rim International Congress on Advanced Materials and Processing Waikoloa, HA, Aug. 7, 2013.

Jakus et al., 3D-Printed Hyperelastic Bone for Hard-Tissue Engineering Applications, Abstract for Presentation at Hilliard Symposium, Northwestern University, May 15, 2014.

Intl. Search Report & Written Opinion issued for Intl. Patent Appl. No. PCT/US2015/030972, dated Aug. 26, 2015, 15 pages.

Calvert et al., Solid freeform fabrication of organic-inorganic hybrid materials., Materials Science and Engineering: C 6.2, 1998, pp. 167-174.

Hong et al., Microstructure and Mechanical Properties of Reticulated Titanium Scrolls, Advanced Engineering Materials, vol. 13, No. 12, 2011, pp. 1122-1127.

Jakus et al., Bioplotted Ceramics and Metals: A Universal Technique for Fabricating Complex, Ordered, and Functional Scaffolds, The 8th Pacific Rim International Congress on Advanced Materials and Processing, Abstract, Aug. 1, 2013.

A. Thorel, Tape Casting Ceramics for high temperature Fuel Cell applications, Ceramic Materials, Wilfried Wunderlich (Ed.), ISBN: 978-953-307-145-9, InTech, Sep. 28, 2010, pp. 49-68.

Falcade et al., Fuel Cell: A Review and a New Approach About YSZ Solid Oxide Electrolyte Deposition Direct on LSM Porous Substrate by Spray Pyrolysis, New Advances in Fundamental Researches and Applications, Dr. Yan Shao (Ed.), ISBN: 978-953-51/0032-4, InTech, Mar. 7, 2012, pp. 139-160.

Farandos et al., 3D Printing of Functional Layers for Solid Oxide Fuel Cells and Electrolysers, ECS Conference on Electrochemical Energy Conversion & Storage with SOFC-XIV, Jul. 26, 2015, Glasgow, Scotland.

Sun et al., 3D Printing of Interdigitated Li-Ion Microbattery Architectures, Advanced Materials 25, Jun. 17, 2013, pp. 4539-4543.

Jaycox et al., 3-D Printing Lunar and Martian Dusts From Liquid 3D-Inks, Poster Presentation at ASM Chicago on Apr. 8, 2014.

Méndez-Ramos et al., Prospective use of the 3D printing technology for the microstructural engineering of Solid Oxide Fuel Cell components, Boletin de la Sociedad Española de Cerámica y Vidrio, vol. 53. Sep. 2014, pp. 213-216.

Jakus et al., 3D Printed Solid Oxide Fuel Cells from High Particle Content Liquid Inks, MRS Fall 2014 Meeting, Dec. 3, 2014.

Ahn et al., Printed Origami Structures, Advanced Materials 22, May 25, 2010.

International Search Report and Written Opinion mailed in PCT Application No. PCT/US2017/042522, dated Sep. 29, 2017.

* cited by examiner

THREE DIMENSIONAL EXTRUSION PRINTED ELECTROCHEMICAL DEVICES

BACKGROUND

The fabrication and assembly of solid oxide fuel cells (SOFCs), including both support and functional layers, remains one of the primary challenges preventing the widespread adoption of SOFCs as an energy conversion technology. SOFC structures produced using traditional manufacturing techniques are inefficient; the structural, non-functional, metallic components significantly contribute to the SOFC manufacturing time, design flexibility, and weight, which precludes the practical use of SOFCs in mobile applications such as transportation.

State-of-the-art methods for producing SOFCs typically involve separate processing of individual components, followed by assembly. Take the example of a planar solid oxide cell (SOC) stack that can be employed as either a fuel cell (SOFC) or an electrolyzer. The active components (cathode, electrolyte, and anode layers) are layered with interconnect plates (typically ferritic stainless steel plates with ceramic coatings). The interconnect plates provide an electrical path between cells, separating the fuel and air streams, and provide gas manifolds for fuel and air distribution. Gas channels are connected to gas manifold holes at the edges of the interconnect plates and cells to form a gas distribution network. Ferritic steel interconnect plates are used because of their low cost, good electrical conductivity, and machinability/formability to produce the gas distribution networks. However, there are serious drawbacks to this design. First, oxide scale formation on the metal surfaces and contamination of the cells by Cr from the steel. Second, the gas sealing that is used to form gas-tight oxidant and fuel flow networks is challenging. Third, massive end plates and bolts are needed to uniformly compress the cells, interconnect plates, and seals. And, the individual SOCs must be sufficiently thick for handling and assembly, leading to relatively high materials cost and concentration polarization losses in thick electrodes.

SUMMARY

Methods for making the electrochemical devices are provided.

One embodiment of a method of making a solid oxide electrochemical device comprises the steps of: casting an ionically conducting electrolyte film comprising an oxide ceramic; casting an anode transition film comprising a composite of the oxide ceramic and a first additional ceramic; casting a cathode transition film comprising a composite of the oxide ceramic and a second additional ceramic; 3D extrusion printing a three-dimensional anode comprising a central portion comprising a plurality of spaced-apart, parallel fibers, the fibers comprising the first additional ceramic, and a peripheral portion forming an annulus around the central portion and comprising a plurality of fibers running directly alongside one another, the fibers in the peripheral portion comprising an insulating ceramic; 3D extrusion printing a three-dimensional cathode comprising a central portion comprising a plurality of spaced-apart, parallel fibers, the fibers comprising the second additional ceramic, and a peripheral portion forming an annulus around the central portion and comprising a plurality of fibers running directly alongside one another, the fibers in the peripheral portion comprising an insulating ceramic; forming a cell structure comprising, from a first end to a second end, the cathode, the cathode transition film, the electrolyte film, the anode transition film, and the anode; bonding together the cathode, the cathode transition film, the electrolyte film, the anode transition film, and the anode to form a green body cell; and co-sintering the green body cell.

Another method of making a solid oxide electrochemical device comprises the steps of: 3D extrusion printing an ionically conducting electrolyte layer comprising an oxide ceramic; 3D extrusion printing a three-dimensional anode comprising a central portion comprising a plurality of spaced-apart, parallel fibers, the fibers comprising an oxide ceramic, and a peripheral portion forming an annulus around the central portion and comprising a plurality of fibers running directly alongside one another, the fibers in the peripheral portion comprising an insulating ceramic; 3D extrusion printing a three-dimensional cathode comprising a central portion comprising a plurality of spaced-apart, parallel fibers, the fibers comprising an oxide ceramic, and a peripheral portion forming an annulus around the central portion and comprising a plurality of fibers running directly alongside one another, the fibers in the peripheral portion comprising an insulating ceramic; forming a cell structure comprising, from a first end to a second end, the cathode, the electrolyte layer, and the anode; bonding the cathode, electrolyte layer, and the anode together in a green body cell; and co-sintering the green body cell.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
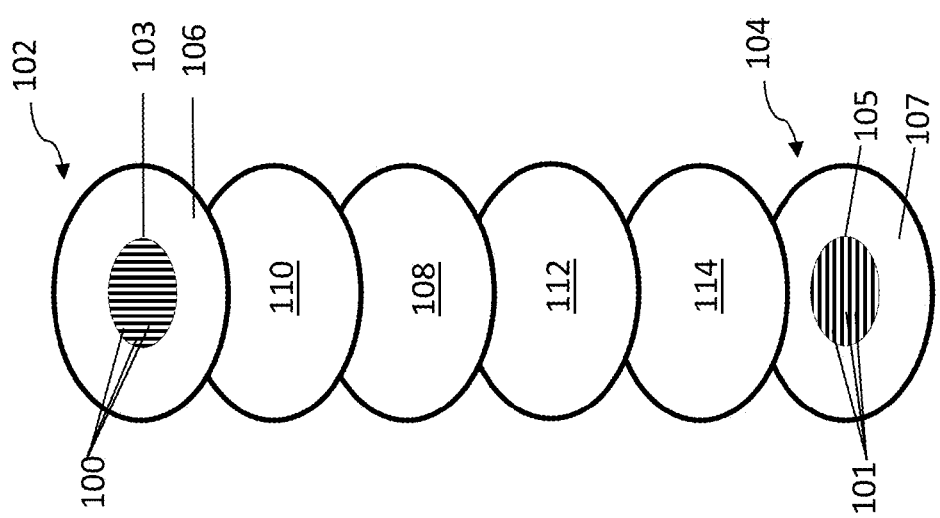
FIG. 1 is a schematic diagram showing an exploded view of a solid oxide fuel cell.

Solid oxide electrochemical devices, methods for making the electrochemical devices, and methods of using the electrochemical devices are provided. Electrochemical devices that can be made using the methods include those that use a chemical reaction to produce electricity, such as a solid oxide fuel cell, and those that use electricity to induce a chemical reaction, such as a hydrogen generator or a solid oxide electrolyzer cell.

One aspect of the invention provides electrochemical devices that comprise a plurality of stacked functional layers that are formed by a combination of three-dimensional (3D)

extrusion printing and two-dimensional (2D) casting techniques. Embodiments of the fabrication methods permit rapid device design and fabrication, allow for a high degree of scalability, and/or address problems associated with co-sintering different ceramic materials in a single structure. Embodiments of the electrochemical devices made using the methods comprise thin, functional material layers in intimate contact. As a result, the methods can eliminate the need for compression hardware, gas seals, and electrical interconnect plates that are used in conventional electrochemical devices.

The functional layers of the devices are 3D extrusion printed or 2D cast using ceramic particle-laden compositions. The nature of the particles in a given composition will depend on the intended function of the layer to be 3D printed or 2D cast from that composition. However, the particles in the compositions will generally comprise oxide and non-oxide ceramics that are found in electrochemical devices, such as solid oxide fuel cells.

The 3D extrusion printing and 2D casting methods can be carried out at, or near, room temperature and ambient pressure. Typically, the temperature will be from about 20° C. up to about 40° C. However, 3D extrusion printing and/or 2D casting can be carried out at higher or lower temperatures.

Ink compositions can be used to print 3D fibers using a 3D printer capable of direct extrusion of an ink composition through a nozzle upon the application of pressure (e.g., via mechanical or pneumatic pressure) to the ink composition, which is held in a container (e.g., a syringe or 3D print head) that is in fluid communication with the nozzle. This type of printing is sometimes referred to as "Direct Ink Writing" (DIW). The optimal or possible 3D extrusion printing rates for the ink compositions will depend on the types of architectures and features being 3D printed. By way of illustration only, in some embodiments of the printing processes, the ink compositions are printed at linear deposition rates in the range from 0.1 mm/s to 150 mm/s.

For the purpose of this disclosure, 2D casting refers to methods of forming a thin (effectively, 2D) planer layer of material by applying a substantially continuous coating of a composition comprising the material onto a substrate and allowing composition to spread out on the surface of the substrate and the volatile components in the coating (for example, solvents) to evaporate, leaving a continuous thin solid film of the material that conforms to the surface of the substrate. The thin solid films can then be removed from the substrate. As used herein, the term casting refers to coating methods in which the films are formed from a liquid solution that spreads readily over the surface of the substrate that is immersed in the liquid solution (as in the case of dip-coating) or onto which the liquid solution is coated (as in the case of drop-coating) and also refers to methods in which the films are formed from a more viscous composition, such as a slurry, that require the application of a force to the composition, other than the force of gravity, for complete spreading (as is sometimes the case in tape casting).

The cast solid films can be quite thin—on the order of the average diameter of the particles in the composition from which they are made—with substantially uniform thicknesses. For example, a 2D film cast from a casting composition comprising ceramic particles with an average diameter of 5 μm can be as thin as 5 μm. For example, some embodiments of the functional layers for the electrochemical devices that are made via a casting technique have thicknesses of no greater than 200 μm. This includes embodiments of the cast layers that have thicknesses of no greater than 100 μm, further includes embodiments of the cast layers that have thicknesses of no greater than 50 μm, further includes embodiments of the cast layers that have thicknesses of no greater than 10 μm, and further includes embodiments of the cast layers that have thicknesses of no greater than 5 μm.

Tape casting (also known as doctor blading) is one example of a suitable casting method. The tape casting method involves depositing a slurry comprising a ceramic powder (i.e., ceramic particles) onto a substrate surface while either the means of deposition, the substrate, or both is moving as the slurry is applied. The resulting coating is then allowed to dry into a thin solid film. Typical thicknesses for a tape cast film lie in the range from about 1 μm to about 500 μm. Dip casting (or "dip coating") is another example of a casting methods. In dip coating a substrate is dipped into a liquid composition and then is withdrawn from the composition, typically at a controlled and constant speed. The resulting coating is then allowed to dry into a thin solid film. Thicker coatings can be built up on a substrate using multiple dip coating steps to form a multi-layered coating. These coatings can comprise multiple layers formed from the same ink composition or from different ink compositions.

The ink compositions and casting compositions generally comprise: a solvent system comprising one or more organic solvents; an elastic organic polymer (i.e., a binder polymer) that is soluble in the solvent system; and solid particles of a material that is insoluble in the solvent system. Examples of suitable ink compositions include those described in PCT Application Publication Number WO2015/175880. In the inks described therein, the solvent system and elastic organic polymer provide a substantially universal solution into which different particles and combination of particles can be incorporated, regardless of the compositions of the particles. Therefore, the solid particles in the ink composition can comprise a broad range of materials and combinations of different materials, including a broad range of oxide and non-oxide ceramics, provided they are insoluble or substantially insoluble in the solvent system.

The ink compositions suitable for 3D extrusion printing are characterized in that they can be 3D printed via extrusion under ambient conditions into self-supporting fibers that form self-supporting 3D objects and architectures. Self-supporting fibers formed by 3D extrusion printing the ink compositions are characterized in that they substantially retain the 3D shape imparted to them by extrusion through a nozzle. By way of illustration, a self-supporting fiber that is extruded through the circular orifice of a nozzle retains a circular (or substantially circular) cross-section, rather than spreading out and conforming to the surface of the substrate onto which it is printed. For this reason, the inks may be referred to as "3D ink compositions".

The compositions used for casting thin film layers can have the same or similar composition as the ink composition used for 3D extrusion printing. However, the formulations for the compositions used in casting also can be altered to render them better suited for casting techniques. For example, the optimal viscosity of a composition will depend on the intended method of deposition (e.g., 3D extrusion printing versus 2D casting). If the ink composition is intended for use as a 3D printing ink, it should have a viscosity suitable for 3D printing via extrusion through a print nozzle. By way of illustration only, some embodiments of the 3D ink compositions that are suitable for 3D printing have a viscosity in the range from about 25 Pa·s to about 40 Pa·s at room temperature. For solution casting applications the optimal viscosities may be lower, typically in the range from about 1 Pa·s to about 5 Pa·s at room temperature.

The ink and casting compositions typically comprise small volume fractions of elastic polymer (elastomer) as a binder. The use of such binders promotes the robustness of structures formed from the compositions. In addition, when the compositions are extruded via a 3D printer, the elastomeric binders provide for the formation of extruded fibers that are continuous, flexible and strong. Moreover, layers formed from the compositions can adopt, at least in part, the elastomeric properties of the elastic polymer binders. Thus, 3D fibers and 2D films made from the compositions are flexible and can be deformed without breaking.

The particles in the ink and casting compositions may have a broad range of sizes and shapes, including both regular, symmetric shapes and irregular shapes. In some embodiments, the compositions include particles having significantly different shapes and sizes, which can comprise the same or different materials. As used herein the term "solid particles" refers to particles that comprise a solid material, as opposed to a liquid (e.g., a droplet). However, the "solid particles" need not be completely solid through their interior. For example, "solid particles" includes porous particles and hollow particles.

The solvent system may be a graded solvent comprising a primary organic solvent that has a high vapor pressure, and therefore evaporates rapidly, at room temperature and atmospheric pressure (~101.3 kPa). The solvent system may further comprise one or more additional organic solvents having lower vapor pressures than the primary solvent at room temperature. Suitably high vapor pressures at room temperature and atmospheric pressure include those in the range from about 20 kPa to about 60 kPa, which includes those in the range from about 25 kPa to about 55 kPa.

Some embodiments of the solvent systems comprise dichloromethane (DCM) as a primary solvent, which may be used in combination with one or more additional organic solvents. The use of DCM is advantageous because, upon extrusion of the ink composition through a 3D extrusion print nozzle, DCM, which is a very high volatility solvent, evaporates very rapidly, leaving a solid, continuous fiber. Chloroform is another example of a suitable primary organic solvent. The primary solvent is the majority solvent in the solvent system. That is, it accounts for at least 50% by volume (vol. %) of the solvents in the solvent system. In some embodiments, the primary organic solvent accounts for at least 70 vol. % of the solvent system. This includes embodiments in which the primary organic solvent accounts for at least 90 vol. % of the solvent system.

The additional organic solvents desirably have vapor pressures that are lower than that of DCM at the desired printing or casting temperature (e.g., room temperature—about 23° C.). As a result, the additional organic solvents evaporate more slowly over time, but permit adjacent 3D printed and/or cast layers to merge together during the evaporation, resulting in a single, monolithic structure with strong interlayer adhesion and fidelity. Some embodiments of the solvent systems comprise an additional solvent that is a surfactant, an additional solvent that is a plasticizer, or a combination of at least two additional solvents—one of which is a surfactant and the other of which is a plasticizer. 2-butoxyethanol (2-Bu) and dibutylphthalate (DBP) are examples of additional organic solvents that may be included in the solvent system. In solvent systems comprising DBP, the DBP can act as a surfactant. However, other organic surfactants can be used in place of, or in combination with, the DBP. In solvent systems comprising 2-Bu, the 2-Bu can act as a plasticizer. However, other organic plasticizers can be used in place of, or in combination with, the 2-Bu. Some of the ink compositions consist essentially of or consist of only a primary solvent, a second solvent that acts as a plasticizer and a third solvent that acts as a surfactant. For example, some of the ink compositions consist of, or consist essentially of, DCM, 2-Bu and DBP. For ink compositions comprising both a plasticizer and a surfactant the preferred mass ratio of the plasticizer to the surfactant will depend, at least in part, on the printing or casting conditions and equipment being used. By way of illustration only, in some embodiments of the solvent systems, the molar ratio of plasticizer to surfactant (e.g., 2-Bu to DBP) is in the range from about 1:1 to about 4:1. This includes embodiments in which the molar ratio is in the range from about 1:2 to about 2:1.

The elastic polymers provide a binder that helps to hold the particles together in the 3D printed fibers and the 2D cast layers. The elastic polymers are characterized by the property of elasticity. The elastic polymers should be soluble or substantially soluble in the solvent system at the intended printing or casting temperature, but are desirably insoluble or substantially insoluble in water at the intended printing or casting temperature, or a higher temperature. The elastic polymer may comprise, for example, a polyester, a polymethacrylate, a polyacrylate, a polyethylene glycol, or a combination of two or more thereof. Examples of suitable polyester polymers that can be included in the ink compositions are polylactic acid (PLA), glycolic acid, copolymers of PLA and glycolic acid (i.e., polylactic-co-glycolic acid (PLGA)), and polycaprolactone (PCL). Some embodiments of the ink compositions comprise blends of one or more of these polyesters with other polyesters or with one or more non-polyester elastomeric polymers.

Only small quantities of the elastic binder are needed to provide fibers and films that are flexible, strong and elastic. For example, some embodiments of the ink compositions comprise no greater than about 50 vol. % binder, based on the solids content of the ink composition. This includes ink compositions that comprise no greater than about 40 vol. %, no greater than about 20 vol. % and no greater than about 10 vol. % of the polymer binder, based on the solids content of the ink compositions. (Note: because the non-solids content of the ink compositions (the solvents) eventually evaporate from structures formed from the ink compositions, the values for the vol. % based on solids content of the ink compositions also reflect the total vol. % for the 3D extrusion printed or cast structures prior to sintering.)

The ink compositions and, therefore, the fibers and films formed from the ink compositions, are characterized by high particle loadings. For example, some embodiments of the ink compositions have a solid particle content of at least 50 vol. % based on the solids contents of the ink compositions. This includes embodiments of the ink compositions that have a solid particle content of at least 60 vol. %, at least 80 vol. % and at least 90 vol. %, based on the solids contents of the ink compositions.

The ink compositions can be made by simply mixing the solvents of the solvent system, the binder polymers and the solid particles with excess primary solvent (for example, DCM) and allowing the primary solvent to evaporate until the ink composition has achieved a viscosity suitable for deposition. This process can be conducted at room temperature and under atmospheric conditions.

A single ink composition may comprise more than one type of particle. Such mixed-particle ink compositions can be made by combining different types of particles with the solvent system and elastic polymer binder to make the single ink composition comprised of multiple particle types. Alternatively, two or more starting ink compositions, each comprising different particle types, can be synthesized separately and then combined to create a final ink composition comprised of multiple particle types.

The solid oxide electrochemical devices have a plurality of functional layers arranged in a multi-layered stack cell structure, including, for example, an electrolyte film, an anode layer, a cathode layer, and/or a separation membrane layer. These layers may be separated by one or more transition layers and/or support layers. At least one of the functional layers is fabricated via 3D extrusion printing, while the remaining layers are made using a casting method. These layers are described below and depicted in FIG. 1 in the context of a solid oxide fuel cells. However, it should be understood that the layers could also be incorporated into other solid oxide electrochemical devices.

FIG. 1 is a schematic illustration of a solid oxide fuel cell in which the anode and cathode layers have been 3D extrusion printed and the transition layers (or 'films') and electrolyte layer (or 'film') have been 2D cast on a support substrate and subsequently removed from that substrate and transferred into the cell structure.

Both the anode 102 and the cathode 104 include a central portion 103, 105 surrounded by a peripheral portion 106, 107. The central portion of each electrode comprises a plurality of 3D extrusion printed fibers 100, 101 that run parallel, are spaced apart along their lengths, and comprise a ceramic. As used herein, the term parallel does not require the fibers to be perfectly parallel, as some deviation from perfection due to limitations in the accuracy of the printing equipment is possible. Therefore, the term parallel includes fibers that run substantially parallel along their long axes. The cross-sectional diameters of, and the spacing between, the fibers can be selected based on the desired dimensions and performance requirements of the electrochemical device. By way of illustration, the fibers may have cross-sectional diameters of less than 500 µm. This includes embodiments of the electrodes in which the fibers have cross-sectional diameters of less than 300 µm. For example, the diameters of the fibers may be in the range from 100 µm to 500 µm. Similarly, the fibers may have inter-fiber spacings of less than 500 µm. This includes embodiments of the electrodes in which the fibers have inter-fiber spacings of less than 300 µm. For example, the inter-fiber spacings of the fibers may be in the range from 100 µm to 500 µm.

3D extrusion printing the central portion of the fuel side electrode in a solid oxide fuel cell is advantageous because the spaced apart fibers provide gas channel with dimensions that are easily defined by the user. In order to maintain the desired fiber spacing in the finished electrode, a sacrificial material may be deposited in the longitudinal channels separating the fibers. Like the fibers themselves, this sacrificial material can be 3D extrusion printed from an ink composition comprising particles of the sacrificial material. The sacrificial material volatilizes during the sintering of the cell structure, as described in greater detail below, and, therefore, is removed from, or substantially removed from, the final cell structure. Carbon materials, such as graphite or graphene, are examples of suitable sacrificial materials.

Peripheral portion 106, 107 forms an annulus around its respective central portion 103, 105 in each electrode. The peripheral portions comprise a plurality of fibers of an insulating ceramic running directly alongside one another. The peripheral portions provide a surface area for the subsequent bonding of the anode and cathode into the cell structure and enclose the central portions. The central portion and peripheral portion of an electrode may comprise the same ceramic material or different ceramic materials.

In a solid oxide fuel cell, the anode provides the site for electrochemical oxidation of combustible fuel gases with ions from the electrolyte and is structured to allow for the diffusion of the fuel gases to the reactive sites in the anode/electrolyte. Thus, the anode should comprise a ceramic having a high ionic and electronic conductivity and catalytic activity for fuel gas oxidation. Suitable materials for the ink compositions used to 3D print the central portion of the anode include nickel-based ceramic metal composites, such as composites of nickel oxide (NiO) and yttria-stabilized zirconia (YSZ) (NiO-YSZ) and similar ceramics in which other metals are alloyed with and/or used to replace the Ni, while oxides, including doped Ceria or (La,Sr)(Mg, Ga)O$_3$ (LSGM) replace the YSZ. A example of a suitable material for the annular portion of the anode is YSZ.

The cathode in a solid oxide fuel cell provides an interface between air, or oxygen, and the electrolyte film. Its primary function is to catalyze oxygen reduction and transport generated electrons. Thus, the cathode should comprise a ceramic having a high ionic and electronic conductivity, a porous microstructure, and catalytic activity for oxygen reduction. Suitable materials for the ink compositions used to 3D print the central portion of the cathode include lanthanum magnetite-based ceramics, including composites of (La, Sr)MnO$_3$ (LSM) or (La, Ca)MnO$_3$ with YSZ and also perovskites, such as (La, Sr)(Co, Fe)O$_3$, and Ruddlesden-Popper phases, such as La$_2$NiO$_4$. An example of a suitable material for the annular portion of the cathode is YSZ.

The electrolyte film 108 in a solid oxide fuel cell allows for the conduction of oxygen ions from the cathode to the anode, where they react with the fuel gases to produce an electric current. Thus the electrolyte film should comprise a dense ceramic with a high ionic conductivity. Examples of suitable materials for the electrolyte film include YSZ, doped ceria with gadolinium, lanthanum gallate (LaGaO$_3$) doped with strontium and magnesium, ceria, or doped ceria/YSZ bi-layers, or LSGM.

An anode transition film 110 is disposed between anode 102 and electrolyte film 108 and a cathode transition film 112 is disposed between cathode 104 and electrolyte film 108. These transition layers prevent or substantially reduce unwanted chemical reactions between the electrolyte film and the electrodes and help with the sintering process (described in greater detail below) that is used to bond the cell structures into a monolithic unit. Anode transition film 110 comprises a first oxide ceramic that is also a primary component or, in some embodiments the only component, of electrolyte film 108. Anode transition film 110 further comprises an additional oxide ceramic, wherein the additional oxide ceramic is a primary component or, in some embodiments, the only component of the central portion of anode 102. In some embodiments, the anode transition film and the anode comprise the same oxide ceramics. For example if the central portion of anode 102 comprises NiO-YSZ and electrolyte film 108 comprises YSZ, then anode transition film 110 may comprise NiO-YSZ. Cathode transition film 112 also comprises the first oxide ceramic that is also a primary component or, in some embodiments the only component, of electrolyte film 108. Cathode transition film 112 further comprises a second additional oxide ceramic, wherein the second additional oxide ceramic is a primary component or, in some embodiments, the only component of the central portion of cathode 104. In some embodiments, the cathode transition film and the cathode comprise the same oxide ceramics. For example if the central portion of cathode 104 comprises LSM and electrolyte film 108 comprises YSZ, then cathode transition film 112 may comprise LSM-YSZ.

Optionally, an anode support film (not shown) can be inserted between anode 102 and anode transition film 110 and/or a cathode support film 114 can be inserted between cathode 104 and cathode transition film 112. The support films, which can be made using solvent casting methods, provide structural support and comprise the same oxide ceramic materials as the central portion of their adjacent electrode.

Once the functional layers are formed they can be assembled into a multi-layered cell structure in which the cathode provides a first end, the anode provides a second end, and the various cast films are stacked in between, as illustrated in FIG. 1. In some embodiments of the cell structure, the fibers in the cathode are oriented perpendicular with respect to the fibers in the anode to provide a solid oxide fuel cell with a cross-flow geometry. The layers that make up the stacked cell structure are then bonded together to form a laminated cell. The bonding can be carried out using, for example, hot press lamination or solvent fusion. In hot press lamination, two or more of the device layers are assembled into a stack and then pressed together under heat to bond the layers to one another. Typical temperatures for the hot pressing process are in the range from about 40° C. to about 80° C., although temperatures outside of this range can be used. Typical pressures for the hot pressing process are in the range from about 800 psi to about 6000 psi, although pressures outside of this range can be used. The order in which the layers are bonded together can vary. By way of illustration only, one can hot press laminate the cathode, the cathode transition layer, and any intervening cathode support layer together in a first step and hot press laminate the anode, the anode transition layer, and any intervening anode support layer together in a second step. Then the electrolyte layer can be hot press laminated between the two previously laminated structures. The result is a flexible green body cell, which retains at least some of the solvent and binder polymers. The green body cell is sufficiently flexible to be folded, cut, plastically deformed, and rolled.

In solvent fusion, a small volume of high volatility solvent, such as DCM, is conservatively applied to surfaces of the independent objects which are to be joined. Solvent can be applied, for example, using a brush (such as a paint brush), syringe, or mist (from a spray bottle). The independent objects are lightly touched at the points of contact that are intended to be joined, without applying substantial pressure. The presence of the small volumes of high volatility solvent locally and temporarily dissolve and solubilize the binding polymer. Upon touching of two surfaces, the locally dissolved materials merge, and the polymer solidifies as the solvent evaporates. This process creates a seamless point of connection between previously independent objects and layers. This process is independent of the solid particle composition of each component being fused. After application of solvent to the surfaces of the objects, the objects must be joined before the solvent evaporates.

Figure 2:
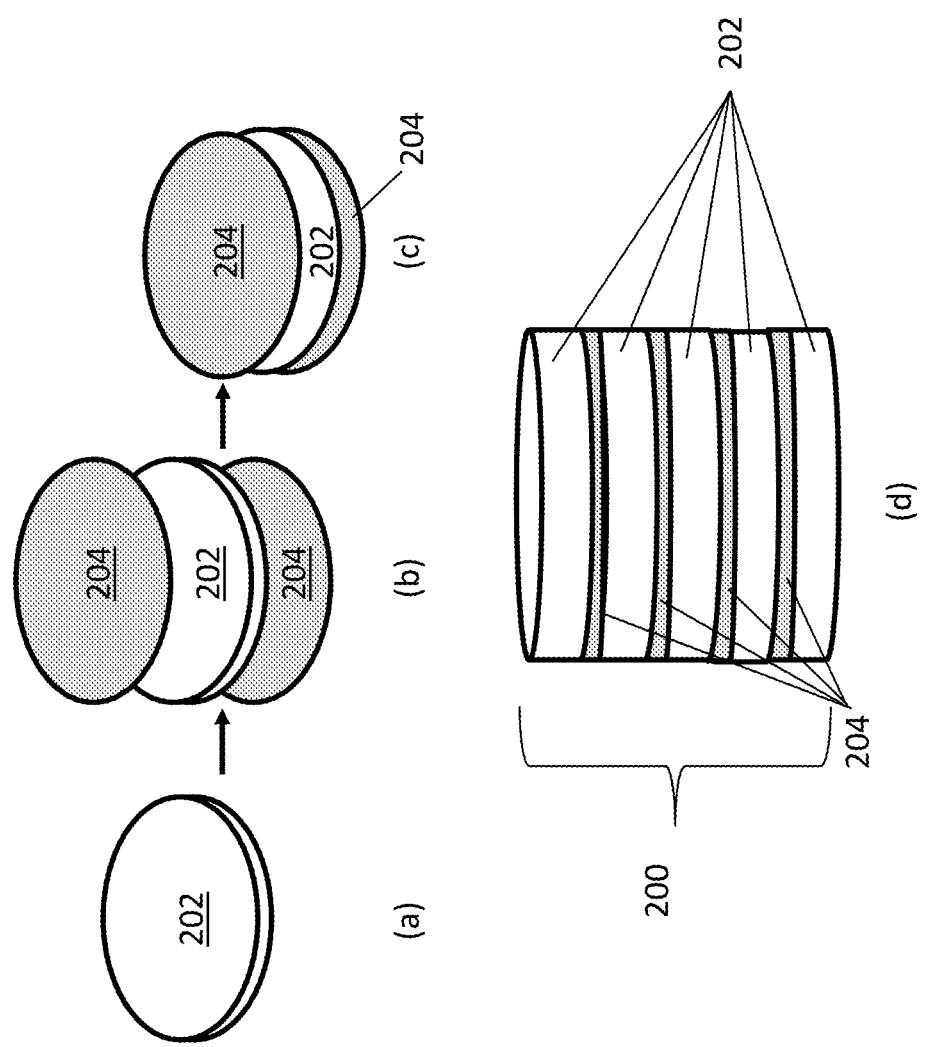
FIG. 2 is a schematic diagram of a process for assembling a solid oxide fuel cell stack.

Once the cell structures have been bonded into laminated cells, multiple cells 202 can then be stacked on one another to form a cell stack 200 (panel (d)), as illustrated schematically in FIG. 2. (In FIG. 2, each cell (panel (a)) may have, for example, the structure shown in FIG. 1.) In order to provide efficient electrical connectivity between the cells in the cell stack, interconnect layers 204 can be disposed above and below the cells in the center of the cell stack (panels (b) and (c)). In some embodiments, the interconnect layer is a bilayer comprising a first sub-layer adjacent to the cathode (i.e., on the air side of the cell) and comprising the same ceramic as the central portion of the cathode (for example LSM) and a second sub-layer adjacent to the anode (i.e., on the fuel side of the cell) in the neighboring cell and comprising a different oxide ceramic having a high electrical conductivity and good mechanical strength. $Sr_{0.8}La_{0.2}TiO_3$ (SLT) is an example of one such oxide ceramic. This bilayer interconnect is superior to metallic interconnects that are difficult to integrate with solid oxide fuel cell sintering procedures and $LaCrO_3$-based interconnects that have very poor sinterability. Once the cells and their intervening interconnect layers have been assembled into a stack, the cell stack then can be bonded together using, for example, hot press lamination or solvent fusion. The result is a green body cell stack.

Once the individual green body cells or green body cell stacks have been bonded, they can be sintered at an elevated temperature to sinter together the ceramic particles in the various layers within the structure. The result is a cell or cell stack that has been densified and is both strong and stiff. Because the cells are multi-material structures, the sintering is a co-sintering process. By selecting appropriate volume ratios of ceramic particles to binder polymer in the ink compositions from which the layer are made (as described above), the different ceramics in the structure undergo similar volumetric (percent) reduction during co-sintering to create a monolithic structure that does not require mechanical fixation via, for example, nuts, bolts or plates, to hold the different layers together. This ensures that warping, cracking, and other forms of undesirable deformation do not result from the co-sintering.

The polymer binders and any sacrificial material or pore-forming material present in the green body layers should be substantially or entirely removed (e.g., volatilized) during the sintering process. (The materials can be considered substantially removed if they are present in a sufficiently low concentration that they do not negatively affect the performance of the electrochemical cell.) This removal (or "burn-out") can take place during the initial stages of sintering in a highly controlled fashion that avoids rapid gas evolution that can damage the structures. This can be accomplished by controlling the heating rate during sintering and the sintering gas atmosphere to limit runaway exothermic burn-out reactions.

The different material components in the structure are desirably co-sinterable at the same, or nearly the same, temperature to achieve their desired microstructures without unwanted materials reactions or interdiffusion. That temperature is desirably relatively low in order to limit reactions and interdiffusion between the various materials and also to limit particle coarsening. For example, embodiments of the green body cells can be sintered at temperatures of 1300° C. or lower, including temperatures of 1250° C. or lower. In order to achieve this, sintering aids can be used. The sintering aids reduce the temperature required to densify key components (e.g., electrolyte and interconnector layers), avoid materials interactions, allow other component materials to maintain their desired porosity and microstructure, and help maintain sintering shrinkages that are the same, or nearly the same, for all materials. An example of a green body cell structure that can be co-sintered in a single step into a monolithic structure without warping or cracking comprises a YSZ electrolyte film the includes 1-3 mol. % $Fe_2O_3$ as a sintering aid, a Ni-YSZ anode, and a (La,Sr)$MnO_3$-YSZ or (La,Ca)$MnO_3$-YSZ cathode.

Another aspect of the invention provides electrochemical devices that comprise a plurality of stacked functional layers in which all of the stacked functional layers are formed by 3D extrusion printing. These electrochemical devices can include the same device layers and be made of the same ceramic materials as those described above for the electrochemical cells that are made from a combination of 3D extrusion printing and 2D casting techniques, except that the thin film layers made via 2D casting would be made via 3D extrusion printing. Thus, the electrolyte layer, the anode transition layer, the anode support layer, the cathode transition layer, and the cathode support layer would be 3D printed layers comprising fiber running directly alongside one another. The 3D printed layers can then be assembled and bonded together in a stacked structure to provide a green body cell structure, using techniques such as hot press lamination or solvent fusion, and then sintered to provide the final cell (as discussed above). Like the electrochemical cells made using a combination of 3D extrusion printing and 2D casting techniques, the all-3D-printed electrochemical cells can be assembled into a cell stack in which a plurality of the cells are stacked with intervening 3D printed interconnect layers.

EXAMPLES

Example 1

This example illustrates the fabrication and performance of a solid oxide fuel cell using a process that combines 2D tape casting or 2D dip coating with 3D extrusion printing. A schematic diagram of the solid oxide fuel cell is shown in FIG. 1.

Particle-Laden Ink Composition Synthesis:
For 3D-Printing:

Ink compositions were produced by adding the desired powder(s) in relevant quantities to a solvent mixture comprised of 2:1 by mass of 2-Bu and DBP with DCM in excess (roughly 8 times as much DCM as 2-Bu, but the exact amount is irrelevant as excess DCM will be evaporated off later). 0.9 g 2 Bu per $cm^3$ powder was added. As an example, 5 $cm^3$ powder would require 4.5 g 2-Bu, 2.25 g DBP, and approximately 36 g DCM. This powder suspension was thoroughly mixed by hand or mechanically shaken to homogeneously distribute the particles throughout the mixed solvents. This could be done for as little as 1 minute or as long as 24 hours. The longer the time given for suspension and homogenization, the less likely clogging would occur during 3D-printing. This particle suspension was added to a DCM solution containing the desired polymer elastomer that previously had been in a dissolved form. The exact amount of DCM depended on the type and amount of polymer that needed to be dissolved. The final solution needed to have a low viscosity (not much higher than water) amenable to easy physical mixing with the powder suspension. The combined mixture, or "pre-ink composition" was then physically stirred at room temperature while left open to the environment, permitting excess DCM to evaporate and the ink composition to thicken over time and achieve a viscosity of 30-60 Pa·S, depending on the diameter of the tip needed for the desired 3D-printed features. This thickening process could be accelerated by heating the pre-ink composition up to 55° C. to more rapidly evaporate excess DCM (boiling point=39° C.). The ink could then be sealed and stored in a dark space at a temperature between 4° C. and 25° C. until use. The longest period for which the ink compositions were stored prior to successful use was 24 months. However, it is possible that ink compositions could be stored for many years prior to use.

All protocols relating to relative quantities of powder(s) to polymer were designed using vol. %. Therefore, even if the powder mass was different between materials systems, as long as the total powder volume between systems was consistent, they could be prepared in the exact same manner. Ink compositions were prepared with powder vol. % between 60% and 90%. The powders used in these examples included yttria-stabilized zirconia (YSZ), lanthanum strontium manganite (LSM), nickel oxide (NiO), strontium lanthanum titanate (SLT), graphite (carbon), and various combinations thereof. The remaining vol. % was comprised of the polymer of choice (PLGA in most cases). Solvent volume was not taken into account for this calculation. Only solids content was counted, since the final printed object would ultimately only be comprised of the powder and polymer. For example, a 70 vol. % YSZ (density=5.68 g/$cm^3$) ink with 30 vol. % polylactic-co-glycolic acid (PLGA) polymer binder (density=1.15 g/$cm^3$) was prepared to contain a total of 4 $cm^3$ solids content. 70% of 4 $cm^3$ is 2.8 $cm^3$, which is equal to 15.9 g YSZ. 30% of 4 $cm^3$ is 1.2 $cm^3$, which is 1.38 g PLGA. Ink compositions could be prepared in larger quantities with relative ease. All powders were purchased commercially and sieved to ensure particles sizes of less than 50 µm.

Using this process, ink compositions comprised of 60-80 vol. % of the following powders (200 nm-50 µm in size) were fabricated:

YSZ with small additions of $Fe_2O_3$ (1-3 mol. % as a sintering aid);

NiO-YSZ (1:1 by mass; mixed prior to formulating the ink compositions);

LSM-YSZ-Carbon; and

SLT with small additions of $Fe_2O_3$ (1-5 wt. % as a sintering aid).

For 2D Dip Coating:

Ink compositions for 2 dip coating were prepared in the exact same manner as described above (for 3D-Printing). However, the ink compositions were not thickened to achieve higher viscosities. Instead, the pre-ink compositions were used as the dip-coating ink compositions.

For 2D Tape Casting:

The following layers were fabricated by a tape casting technique:

NiO-YSZ (50 wt. %);
LSM-30 wt. % graphite;
[LSM-YSZ (50 wt. %)]-30 wt. % graphite;
YSZ-(1 mol. %-3 mol. %) $Fe_2O_3$;
SLT-5 wt. % $Fe_2O_3$; and
LSM.

The powders were mixed with ethanol and xylenes as solvents, an appropriate amount of menhaden fish oil was added as a dispersant, and the mixture was ball milled for 24 hours. Afterward, polyvinyl butyral (binder) or PLGA binder, butylbenzyl phthalate (plasticizer) and polyalkylene glycol (plasticizer) were added into the mixture, which was then ball milled for additional 24 hours. The slurry was tape casted to form a membrane through a Richard E. Mistler tape casting machine.

3D Printing Substrate Preparation:

The ink compositions were 3D-printed directly onto thin PLGA substrates. This permitted easy handling of the SOFC structures after they were created, without having to touch and potentially damage any of the functional layers. PLGA substrates were created by casting a "PLGA" ink comprised of 2.25 g PLGA dissolved in 0.9 g 2-Bu+0.45 g DBP+DCM (excess), or differing amounts with the same ratios, into a flat container. After several minutes to several hours, the result was a thin PLGA film with a thickness in the range of 100-500 μm. This film could be handled and cut into sections to act as substrates for 3D-printing of SOFC materials.

Multi-Material 3D Printing:

In order to create multi-material 3D-printed structures such as the SOFCs, the 3D-printer had multi-material printing capacity. In this instance, the 3D-Bioplotter (Envision TEC) had multiple cartridge slots. The respective ink compositions were placed into each of these slots and the instrument sequentially deposited the desired materials at the points previously defined within the digital file prior to printing.

3D-Printed Anode Layer:

The anode was 3D-printed using three materials: YSZ (peripheral portion), NiO-YSZ (central portion), and graphite (used as a sacrificial material that was burnt out during sintering). This anode was a single 3D-printed layer with a nominal thickness of 275 μm. Using a 510 μm diameter nozzle, a series of parallel, spaced-apart NiO-YSZ struts (i.e., fibers) were 3D-printed at a linear deposition speed of 3-20 mm/s with a lateral spacing of ~500 μm to provide the central portion of the anode having an outer diameter of 10 mm. The spacings formed gas channels on the fuel gas side of the fuel cell. A graphite ink composition (70% by volume) was deposited into the gaps between the NiO-YSZ struts using a 510 μm nozzle and a 3D-printing process similar to that used to form the NiO-YSZ struts. A solid (i.e., without spacings between the struts) peripheral portion of the anode was formed as a solid annulus around the central portion. The peripheral portion had a 19 mm diameter and was 3D-printed using a 70 vol. % YSZ ink composition. Upon completion, the 3D-printed anode could be immediately handled.

3D-Printed Cathode Layer:

The 3D-printed cathode was produced in the same manner as the 3D-printed anode, except that LSM particles were used in place of NiO-YSZ particles in the ink composition. (Although no pore former particles were used in this example, depending on the desired microstructure, the LSM ink composition could contain upwards of 30 wt. % graphite to act as a pore former during sintering.)

2D Tape Casting of Thin Films:

Single Material Tape Cast Films:

The NiO-YSZ anode, YSZ electrolyte film, and LSM-YSZ-graphite cathode were prepared by tape casting.

Multi-Material Tape Cast Films:

SLT-5 mol. % $Fe_2O_3$ and LSM were tape casted separately and heat laminated at 80° C. under pressure of 5000 psi to provide a bi-layer interconnect.

The tape caster was a standard commercial instrument that applied a slurry onto a moving plastic carrier film. The slurries comprised the ceramic powders mixed with the solvents, binder polymer, and plasticizer. They were prepared as follows: the powders were ball milled with a mixture of ethanol, xylenes and Menhaden fish oil as dispersants for 24 h. A polyvinyl butyral (binder), butylbenzyl phthalate (plasticizer), and poly alkylene glycol (plasticizer) were added into the mixture, and it was ball milled for another 24 h.

2D Dip Coating of Thin Films:

Single Material (Single- or Multi-Layered) Dip Coated Films:

Pre-ink compositions with a viscosity in the range of 0.5-10 Pa*s were utilized in conjunction with smooth glass substrates, such as glass slides or cover slips, to produce <5 μm thick thin films. The substrate (e.g., a glass slide; however, the substrate need not be a flat plate) was manually dipped into the pre-ink composition of interest, held for 1-5 seconds, and slowly extracted, which resulted in an instantaneously dry thin film on the slide. The thin film could be physically removed and immediately used or stored for later use. If thicker films were desired, this process could be repeated with the same substrate, waiting 10-30 seconds between each dip coat. Using this process, the thickness of the resulting film could be controlled.

Multi-Material Dip Coated Films:

The same multiple layer technique as described above was used. However, the substrate was sequentially dipped into different pre-ink composition solutions. As an example a glass slide could be sequentially dipped into YSZ, NiO-YSZ, and LSM ink compositions. The dried film could then be removed from the substrate, resulting in a solid, multi-layer/material structure.

Combining 3D-Printed Electrodes with Cast (Tape Cast or Dip Coated) Thin Films:

Single or multi-material thin film layers created via dip-coating or tape-casting methods (described above) were manually arranged in a cell structure once the relevant preceding layer was finished printing. Due to the similarity in materials (i.e., PLGA) within each ink, and the fact that the previously deposited layer was still slightly moist with solvent, the thin film immediately adhered and fused to the previously 3D-printed layer. The 3D-printing process then continued, fusing the preceding printed layer onto the top of the thin film.

Laminating 3D Printed and 2D-Tape-Cast Components to Create a Cell-Structure:

A 19 mm diameter solid disk (~100 μm thick) of the tape cast LSM cathode transition film was hot press laminated with a 19 mm diameter solid disk (~200 μm thick) of the tape cast LSM cathode support film and the 3D-printed cathode at 75° C. under 5000 PSI.

A 19 mm diameter solid disk (~100 μm thick) of the tape cast NiO-YSZ anode support film was hot press laminated with a 19 mm diameter solid disk (~200 μm thick) of the tape cast LSM anode support film and the 3D-printed anode at 45° C. and 1000 PSI.

A 19 mm diameter solid disk (~100 μm thick) of the tape cast YSZ electrolyte film was placed between the two previously laminated anode and cathode stacks and the structure was then hot press laminated together at 45° C. and 1000 PSI.

These three steps yielded a green body solid oxide fuel cell structure ready for sintering.

Sintering of the Solid Oxide Fuel Cell:

Sintering of the green body solid oxide fuel cell structure was performed at 1250° C. in air for 4 hours using a lab-based furnace with a ramping rate of 5° C. $min^{-1}$ for heating and cooling. The green tape was calcined at 600° C. for 1 hour to burn out all the organics with a ramping rate of 3° C. $min^{-1}$. The sintered structures were then allowed to cool down to room temperature prior to characterization and testing. Depending on the composition, a varying degree of linear shrinkage occurred. Based on this information, the ink compositions were tailored, resulting in nearly uniform shrinkage across the materials Characterization and Testing of SOFC Structures:

Electrochemical impedance spectroscopy (EIS) measurements were taken on an IM6 Electrochemical Workstation (ZAHNER, Germany) under an open circuit voltage state using a 20 mV AC signal in the frequency range of from 100 mHz to 100 kHz. For the fuel cell testing, a silver grid (Heraeus Inc., Pennsylvania) was screen printed onto the cathode to enhance current collection. The cell was sealed onto an alumina tube with an Ag ink (DAD-87), Shanghai Research Institute of Synthetic Resins). During fuel cell testing, the cathode was exposed to static air while the anode was exposed to humidified $H_2$ (3 vol. % $H_2O$) with a flow rate of 100 sccm in the temperature range of 650-800° C.

Figure 3:
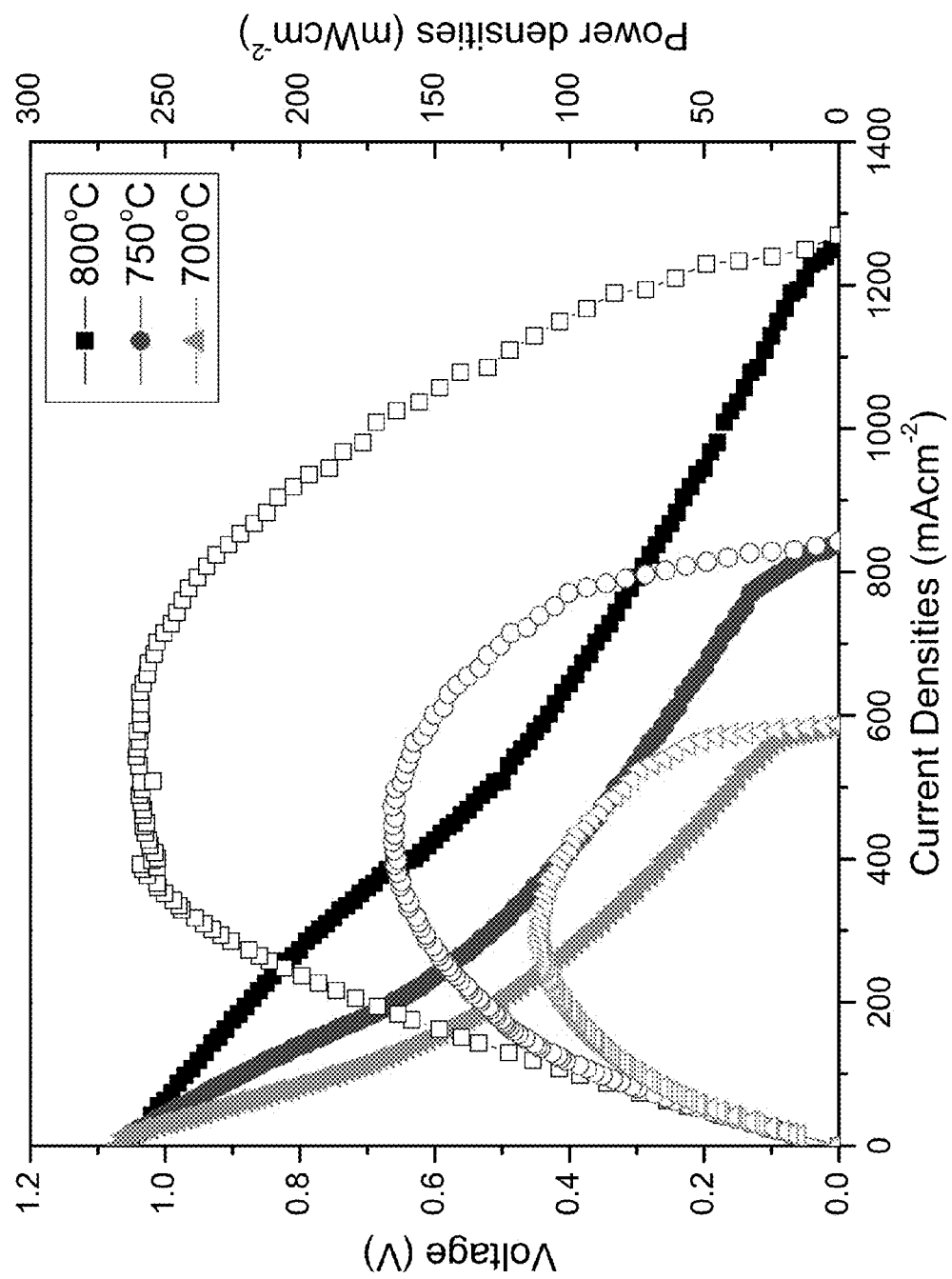
FIG. 3 is a graph of voltage versus current density at various operating temperatures for the solid oxide fuel cell of Example 1.
Figure 4:
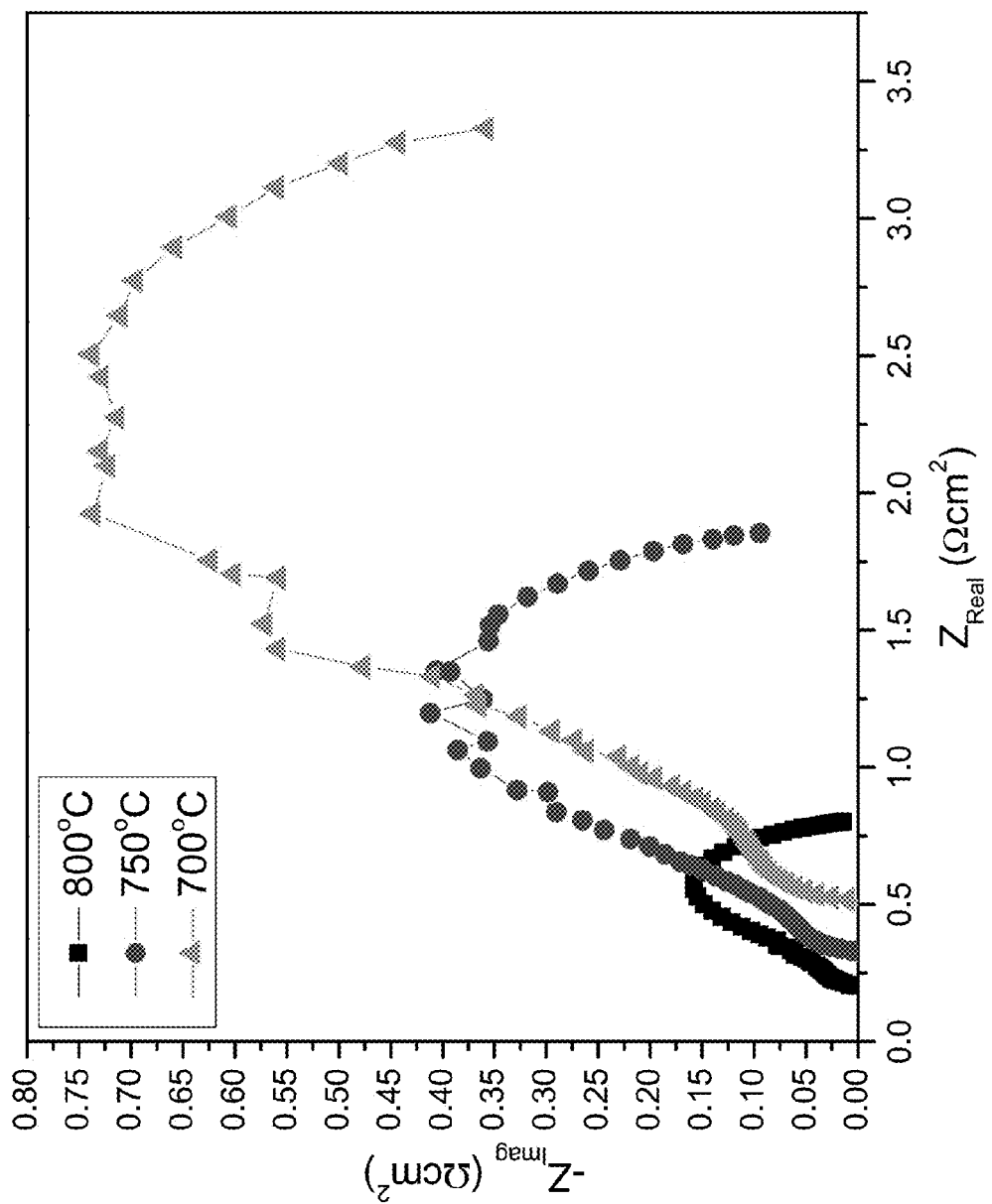
FIG. 4 is a Nyquist plot showing the electrochemical impedance versus resistance as a function of temperature for the solid oxide fuel cell of Example 1.
Figure 5:
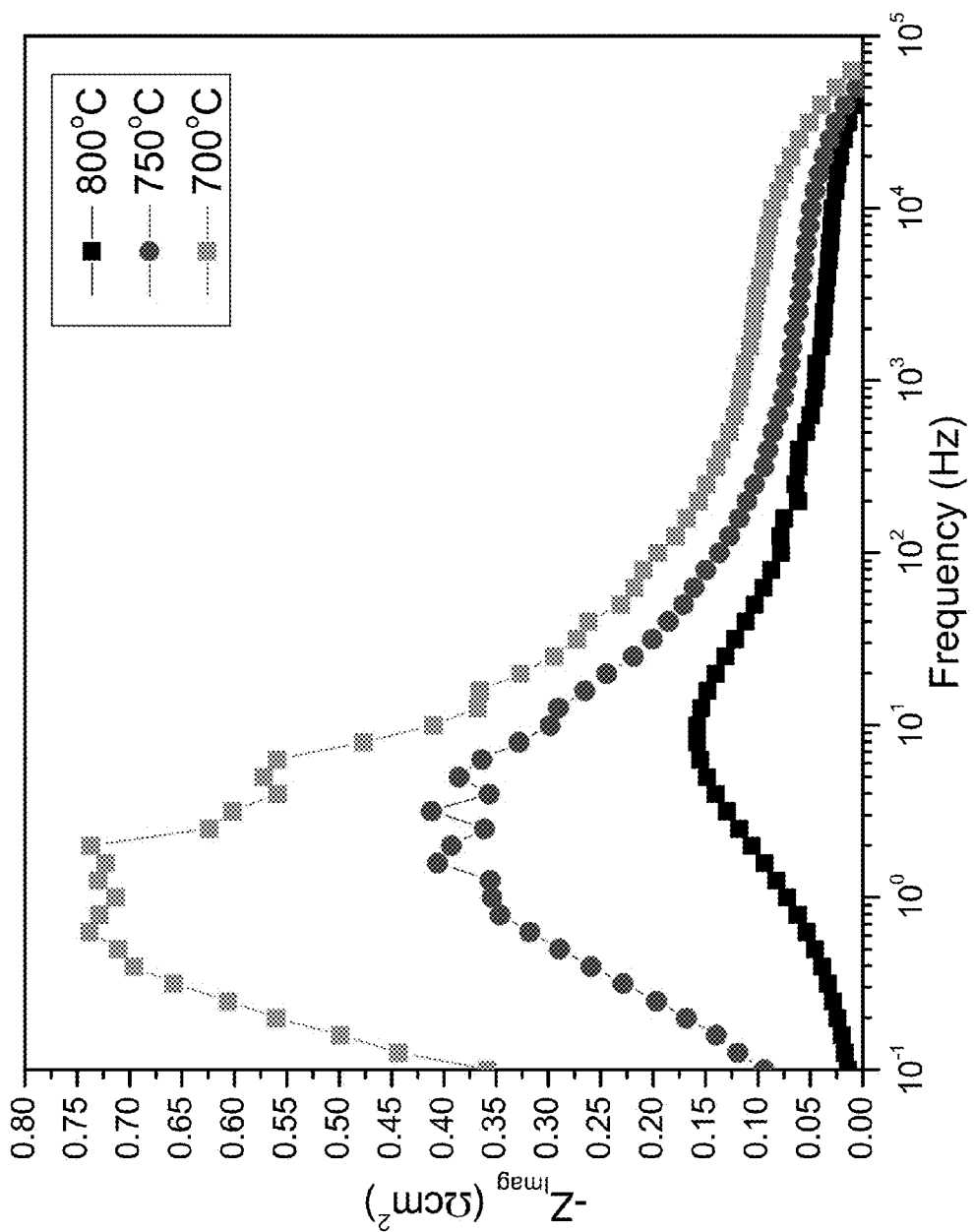
FIG. 5 is a graph of impedance as a function of operating frequency at multiple temperatures for the solid oxide fuel cell of Example 1.

Results:

Plots of the operating characteristics of the fuel cell are shown in FIGS. 3-5. FIG. 3 is a graph of voltage versus current density at various operating temperatures; FIG. 4 is a Nyquist plot showing the electrochemical impedance versus resistance as a function of temperature; and FIG. 5 is a graph of impedance as a function of operating frequency at multiple temperatures. These results illustrate that the solid oxide fuel cell is a functional device.

Example 2

This example illustrates the fabrication of a solid oxide fuel cell using exclusively 3D extrusion printing.

An anode was 3D-printed using three ink compositions: a YSZ-based ink composition, a NiO-YSZ-based ink composition, and a graphite-based ink composition, as shown above. This anode was a single 3D-printed layer with a nominal thickness of 275 μm (digitally sliced using Bioplotter software). Using a 510 μm diameter nozzle, a series of parallel, spaced-apart NiO-YSZ struts (fibers) were 3D-printed to provide a central portion of the anode. These formed gas channels on the fuel gas side of the cell. The length of each of these parallel struts was determined by its intersection with the 10 mm diameter annulus of the peripheral portion of the anode, with the central strut passing through the center of the annulus (and therefore having a length of about 10 mm). The spacing of the struts from center-to-center was 1 mm and each strut was approximately 400 μm thick, meaning that the inter-strut spacing was approximately 400 μm. Into the spaces between the struts, graphite fibers were 3D-printed using a 510 μm nozzle; this was done by 3D-printing the same digital part which produced the NiO-YSZ struts, only offset in a direction perpendicular to the struts by a distance of 400 μm. The graphite material preserved the integrity of the NiO-YSZ gas channels and burned-out during subsequent thermal processing (sintering). Around these struts a 10 mm diameter circular contour (ring) of YSZ material was 3D-printed using a 510 μm to provide the peripheral portion of the anode. The peripheral portion contacted and bonded with the NiO-YSZ and graphite struts. A second concentric circular contour (ring) of diameter 19 mm was subsequently printed around the first (the two contours were concentric). The area between these two circular contours was filled with a 3D printed dense YSZ material, which achieved a dense, uniformly thick YSZ annulus a surrounding the previously 3D-printed NiO-YSZ and graphite struts.

The electrolyte layer was 3D-printed directly atop the preceding electrolyte layer (anode, in this example). Unlike the electrolyte layers, the ceramic component of the ink composition used to print this layer was comprised of only a single material, YSZ, which simplified the printing in comparison to the other layers. This layer was a 19 mm diameter circle with nominal thickness of 275 μm.

The cathode was produced in the same manner as the anode, simply exchanging the NiO-YSZ ink composition for a LSM ink composition. Specifically, the cathode was 3D-printed using three ink compositions: a YSZ-based ink composition, a LSM-based ink composition, and a graphite-based ink composition. The cathode was a single 3D-printed layer with a nominal thickness of 275 μm (digitally sliced using Bioplotter software). Using a 510 μm diameter nozzle, a series of parallel, spaced-apart LSM struts were 3D-printed. These formed gas channels on the fuel gas side of the fuel cell. The length of each of these parallel struts was determined by its intersection with the 10 mm diameter annulus of the peripheral portion of the anode, with the central strut passing through the center of the annulus (and therefore having a length of about 10 mm). The spacing of the struts from center-to-center was 1 mm and each strut was approximately 400 μm thick, meaning that the inter-strut spacing was approximately 400 μm. Into the spaces between the struts, graphite fibers were 3D-printed using a 510 μm nozzle; this was done by 3D-printing the same digital part which produced the LSM struts, only offset in a direction perpendicular to the struts by a distance of 400 μm. The graphite material preserved the integrity of the LSM gas channels and burned-out during subsequent thermal processing (sintering). Around these struts a 10 mm diameter circular contour (ring) of YSZ material was 3D-printed using a 510 μm to provide the peripheral portion of the anode. The peripheral portion contacted and bonded with the LSM and graphite struts. A second concentric circular contour (ring) of diameter 19 mm was subsequently printed around the first (the two contours were concentric). The area between these two circular contours was filled with a 3D printed dense YSZ material; in order to do this, the struts' distance from contour was 300 μm and the distance between struts was 570 μm (these in order to prevent the nozzle head from contacting previously deposited materials), which achieved a dense, uniformly thick YSZ annulus a surrounding the previously 3D-printed LSM and graphite struts.

Figure 6:
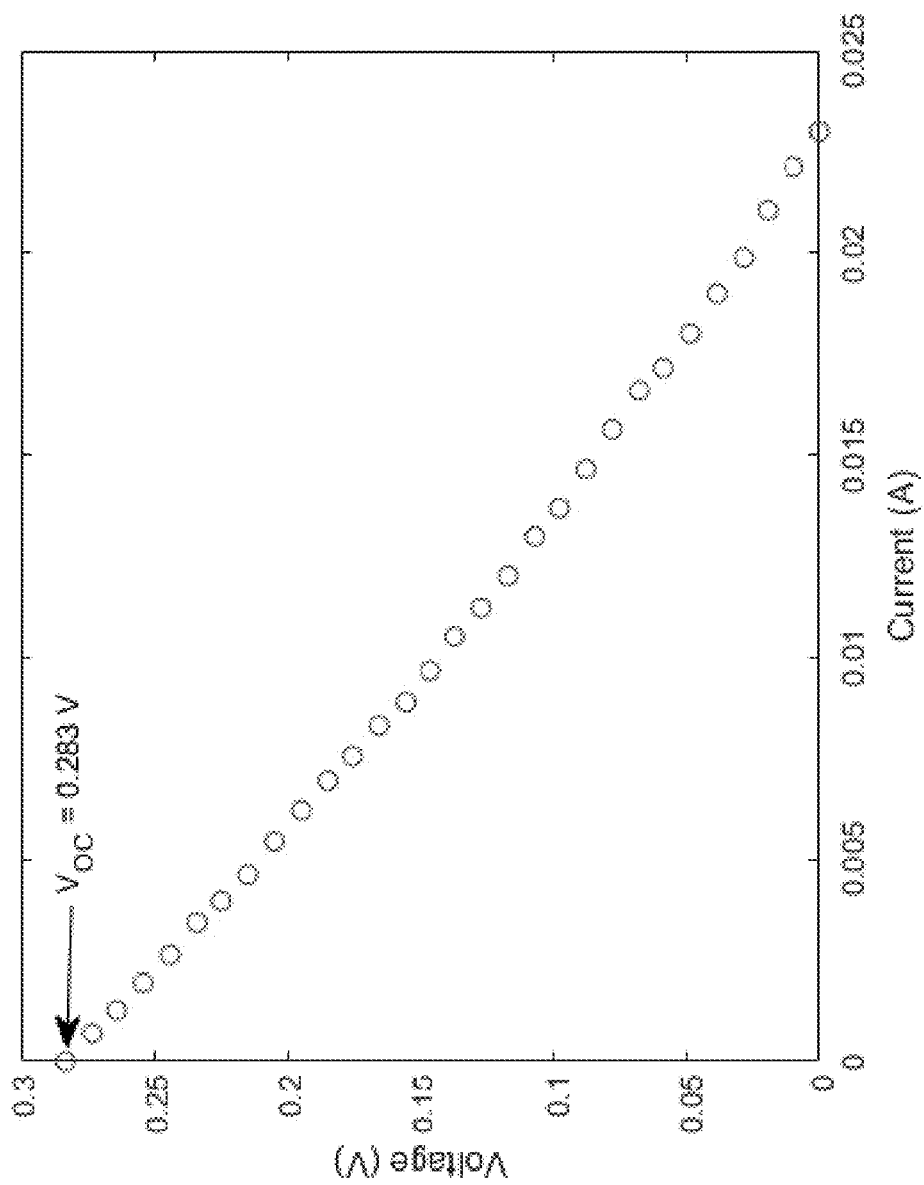
FIG. 6 is a plot of the current-voltage (V-I) behavior of the solid oxide fuel cell of Example 2.
Figure 7:
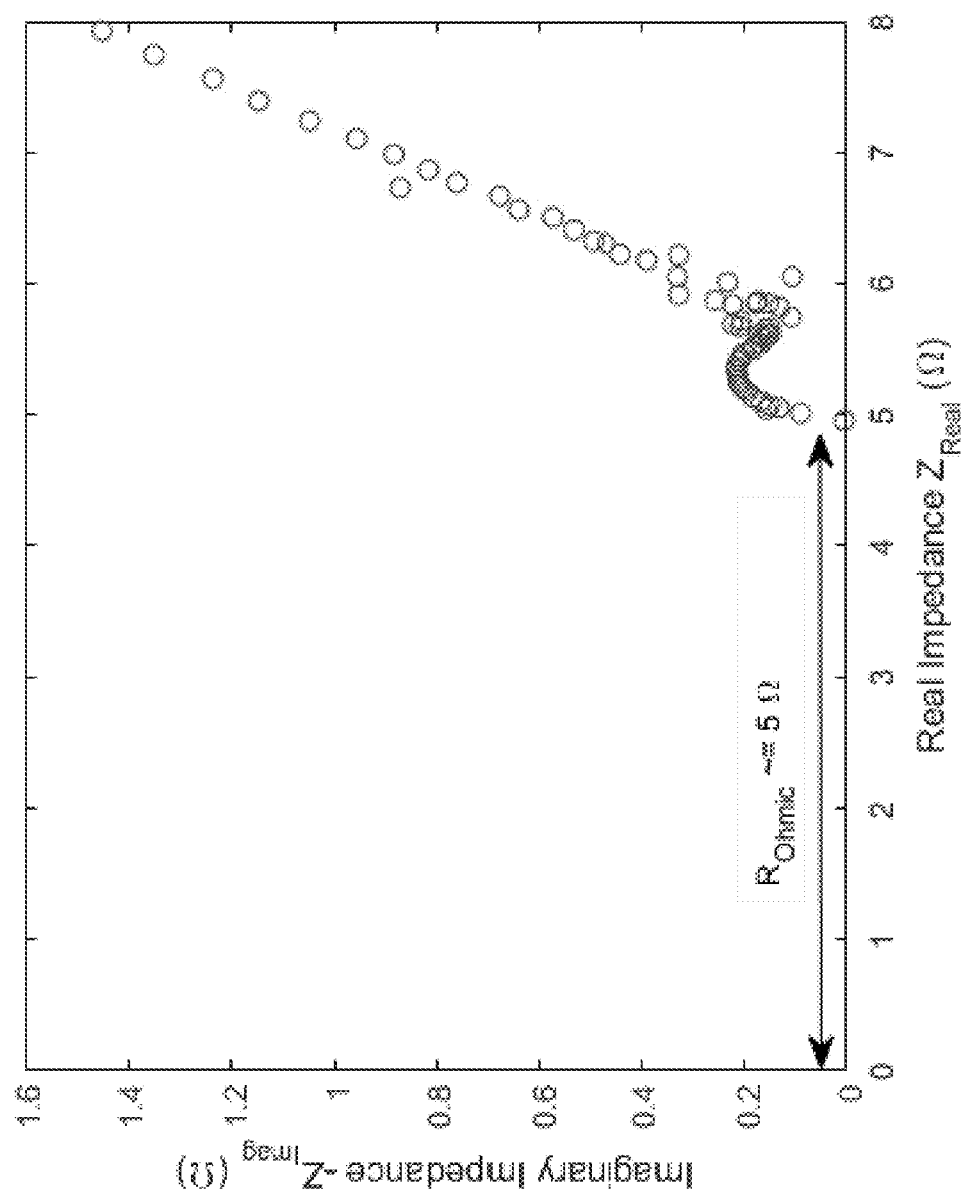
FIG. 7 is a Nyquist plot for the solid oxide fuel cell of Example 2.

A plot of the V-I behavior of the solid oxide fuel cell is shown in FIG. 6. A Nyquist plot for the solid oxide fuel cell is shown in FIG. 7. These results illustrate that the solid oxide fuel cell is a functional device.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of making a solid oxide electrochemical device, the method comprising:
    casting an ionically conducting electrolyte film comprising an oxide ceramic;
    casting an anode transition film comprising a composite of the oxide ceramic and a first additional ceramic;
    casting a cathode transition film comprising a composite of the oxide ceramic and a second additional ceramic;

3D extrusion printing a three-dimensional anode comprising a central portion comprising a plurality of spaced-apart, parallel fibers, the fibers comprising the first additional ceramic, and a peripheral portion forming an annulus around the central portion and comprising a plurality of fibers running directly alongside one another, the fibers in the peripheral portion comprising an insulating ceramic;

3D extrusion printing a three-dimensional cathode comprising a central portion comprising a plurality of spaced-apart, parallel fibers, the fibers comprising the second additional ceramic, and a peripheral portion forming an annulus around the central portion and comprising a plurality of fibers running directly alongside one another, the fibers in the peripheral portion comprising an insulating ceramic;

forming a cell structure comprising, from a first end to a second end, the cathode, the cathode transition film, the electrolyte film, the anode transition film, and the anode;

bonding together the cathode, the cathode transition film, the electrolyte film, the anode transition film, and the anode to form a green body cell; and co-sintering the green body cell.

2. The method of claim 1, wherein the spaced-apart, parallel fibers in the anode are oriented perpendicular with respect to the spaced-apart, parallel fibers in the cathode.

3. The method of claim 1, wherein casting the ionically conducting electrolyte film, casting the anode transition film, and casting the cathode transition film comprises casting each film by tape casting, dip coating, or a combination thereof.

4. The method of claim 1, wherein bonding together the cathode, the cathode transition film, the electrolyte film, the anode transition film, and the anode in the cell structure comprises hot press laminating the cathode, the cathode transition film, the electrolyte film, the anode transition film, and the anode in the cell structure.

5. The method of claim 1, wherein bonding together the cathode, the cathode transition film, the electrolyte film, the anode transition film, and the anode in the cell structure comprises solvent laminating the cathode, the cathode transition film, the electrolyte film, the anode transition film, and the anode in the cell structure.

6. The method of claim 1, further comprising:
casting an anode support film having the same composition as the spaced-apart, parallel fibers of the anode;
casting a cathode support film having the same composition as the spaced-apart, parallel fibers of the cathode; and
prior to bonding together the cathode, the cathode transition film, the electrolyte film, the anode transition film, and the anode in the cell structure, disposing the cathode support film between the cathode and the cathode transition film in the cell structure and disposing the anode support film between the anode and the anode transition film in the cell structure.

7. The method of claim 1, wherein the oxide ceramic is YSZ, the first additional ceramic is LSM, the second additional ceramic is NiO, and the insulating ceramic is YSZ.

8. The method of claim 7, wherein the spaced-apart, parallel fibers of the cathode further comprise particles of a sacrificial material prior to co-sintering, wherein the particles of sacrificial material vaporize during co-sintering to form pores in the fibers.

9. The method of claim 1 further comprising depositing a sacrificial spacer material between the plurality of spaced-apart, parallel fibers of the cathode and between the plurality of spaced-apart, parallel fibers of the anode, before the anode and cathode are bonded into the cell structure, wherein the sacrificial spacer material vaporizes during the co-sintering of the bonded cell structure.

10. The method of claim 9, wherein the sacrificial spacer material is graphene.

11. The method of claim 1, wherein the anode and cathode each have a thickness of no greater than 500 µm, the electrolyte film, the cathode transition film, and the anode transition film each have a thickness of no greater than 200 µm, and the sintered cell structure has a thickness of no greater than 1600 µm.

12. The method of claim 1, wherein the co-sintering is carried out at a temperature of no greater than 1300° C.

* * * * *